United States Patent [19]
Molnar et al.

[11] 3,991,633
[45] Nov. 16, 1976

[54] ADJUSTABLE STEERING COLUMN ASSEMBLY

[75] Inventors: John Molnar, Aurora; James E. Schimpf, Joliet, both of Ill.

[73] Assignee: Caterpillar Tractor Co., Peoria, Ill.

[22] Filed: July 11, 1975

[21] Appl. No.: 595,478

[52] U.S. Cl. ................................ 74/493; 74/527; 251/279
[51] Int. Cl.[2] ...................... B62D 1/18; G05G 5/18
[58] Field of Search ............... 74/493, 527; 251/279

[56] References Cited
UNITED STATES PATENTS

| | | | |
|---|---|---|---|
| 2,185,779 | 1/1940 | Tveidt | 74/493 |
| 3,307,420 | 3/1967 | Fisher | 74/493 |
| 3,555,924 | 1/1971 | Scheffler, Jr. | 74/493 |
| 3,691,866 | 9/1972 | Berkes | 74/493 |

*Primary Examiner*—Allan D. Herrmann
*Attorney, Agent, or Firm*—Phillips, Moore, Weissenberger, Lempio & Strabala

[57] ABSTRACT

A steering arrangement for construction vehicles and the like comprises a steering column assembly pivotally mounted on a stationary support for selective adjustment about a pivot axis disposed transversely relative to such assembly. A steering handle, rotatably mounted on the assembly, is operatively connected to a steering valve by linkage means for selectively steering a vehicle in response to rotation of the steering handle. The linkage means includes a push-pull cable having its upper end pivotally mounted about a pivot axis coincident with the pivot axis about which the steering column assembly is pivotally mounted on the stationary support to prevent actuation of the steering valve upon adjustment of the steering column assembly.

20 Claims, 9 Drawing Figures

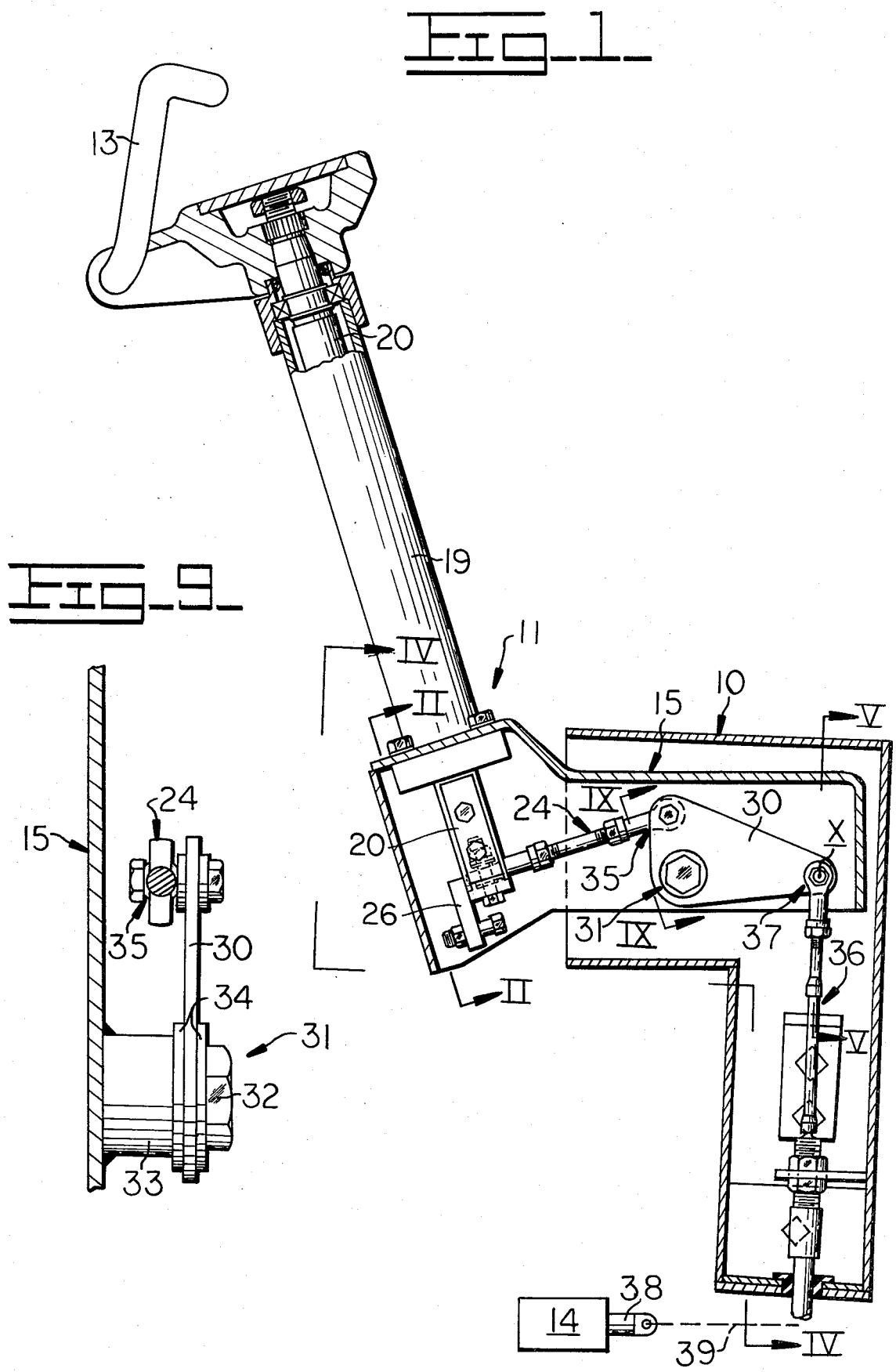

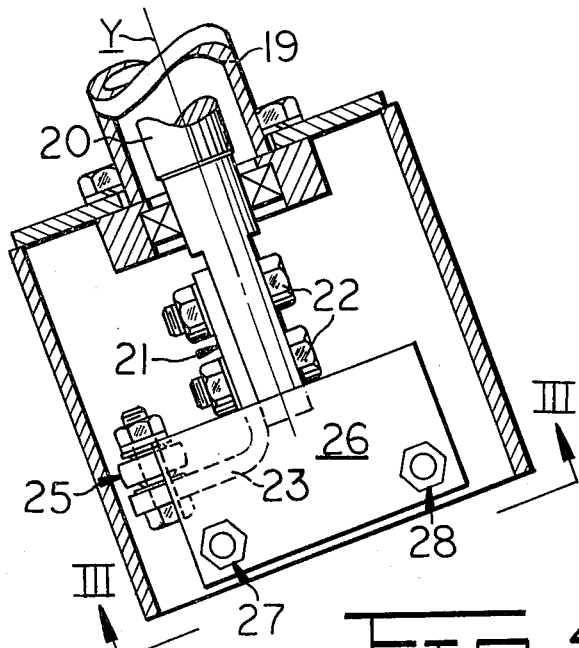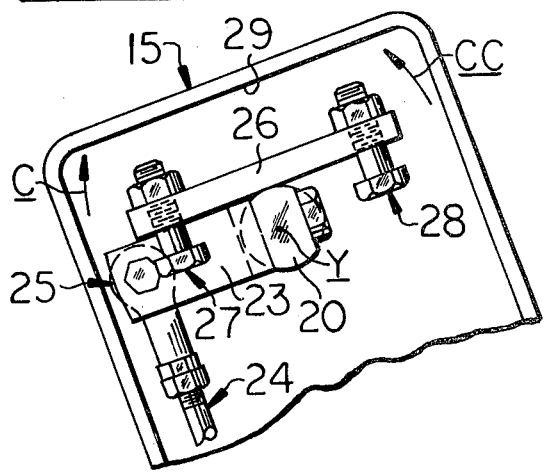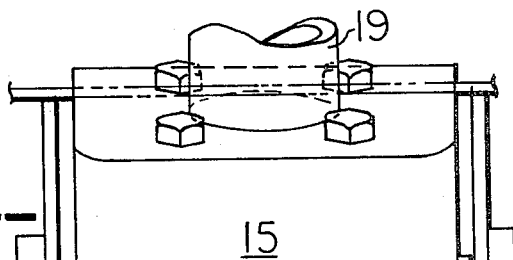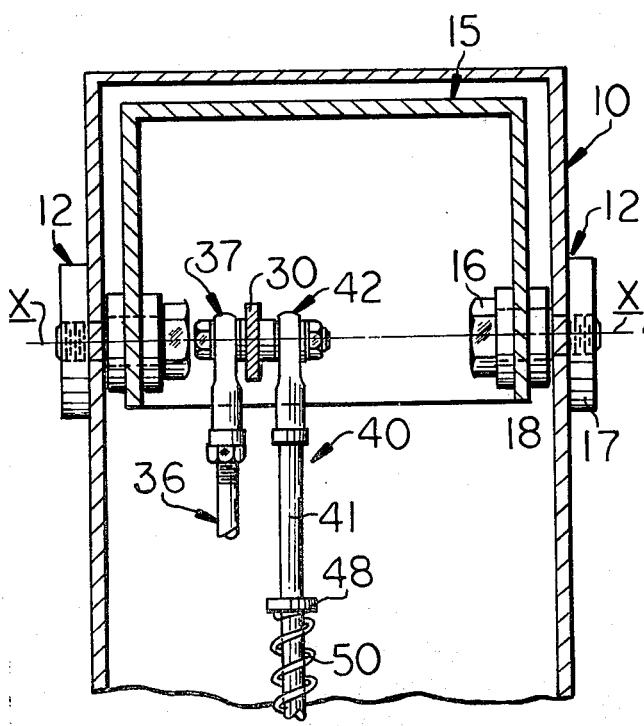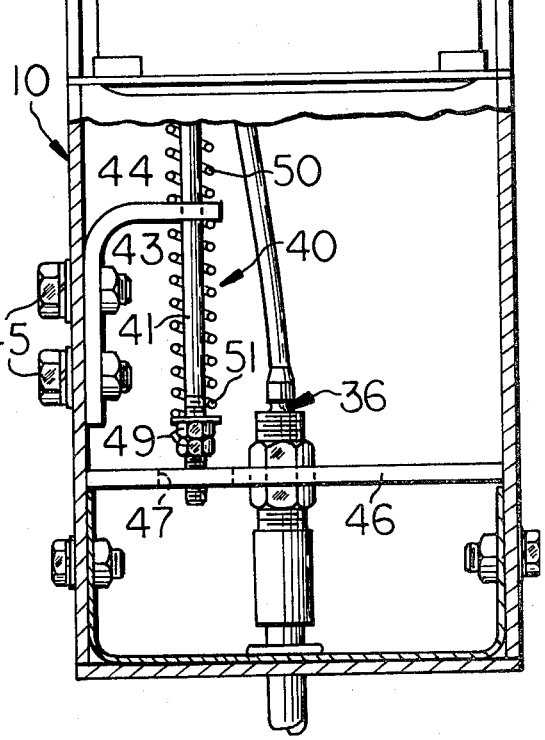

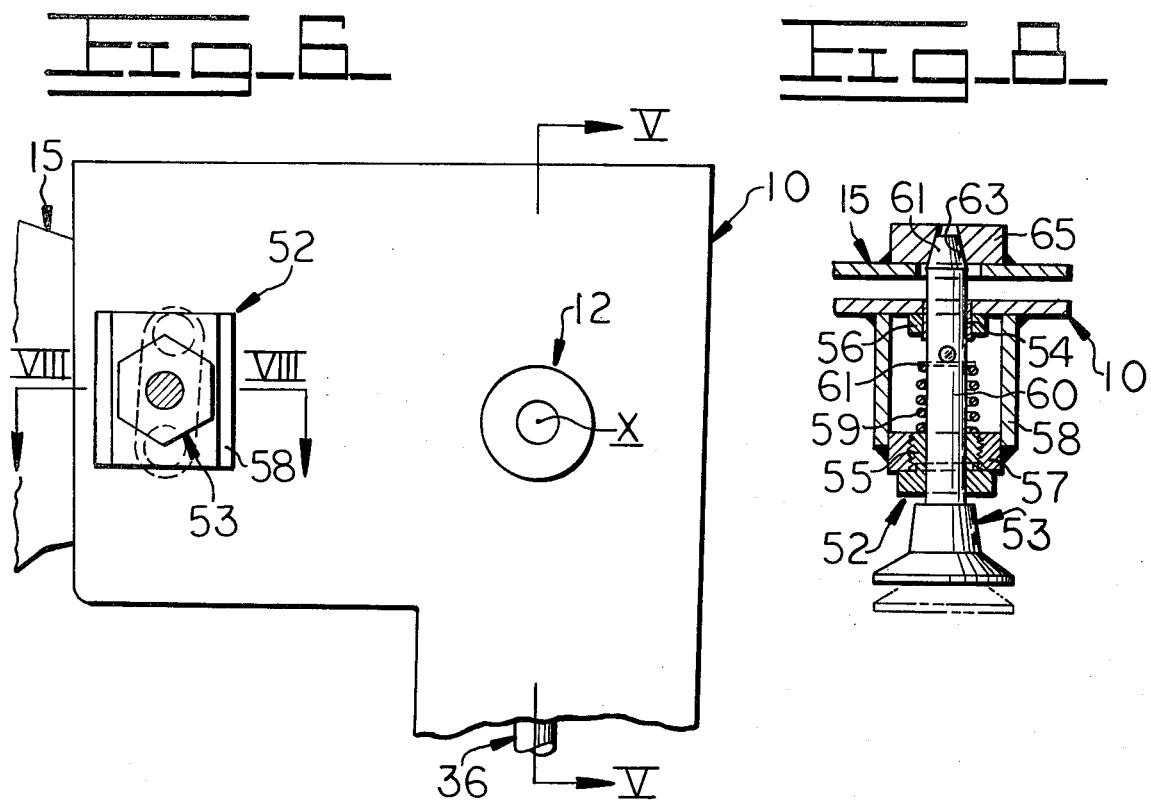
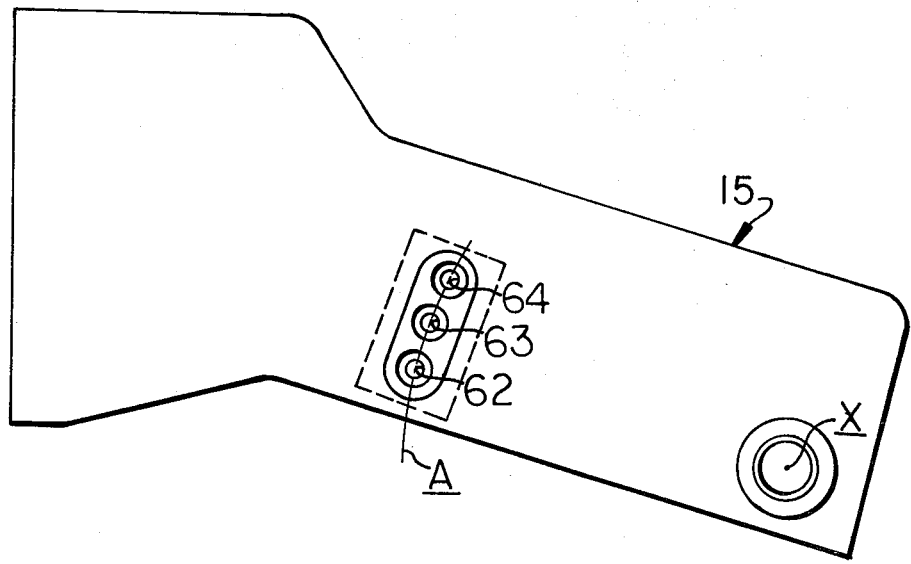

ADJUSTABLE STEERING COLUMN ASSEMBLY

BACKGROUND OF THE INVENTION

This invention relates to a steering arrangement particularly adapted for use in construction vehicles, such as articulated tractors, whereby an operator selectively steers the vehicle by selectively conditioning steering valves upon rotation of a steering handle. The advent of adjustable steering column assemblies to accommodate various sizes of operators has dictated the need for means to prevent actuation of the steering valves upon such adjustment. In particular, it is desirable to maintain the steering valves in a neutral condition of operation upon pivotal adjustment of the steering column assembly to its various positions.

SUMMARY OF THIS INVENTION

An object of this invention is to provide a noncomplex and economical steering arrangement for vehicles wherein a steering column assembly thereof may be adjusted to various positions without actuating a steering valve employed therein. The steering column assembly is pivotally mounted on a stationary support for selective adjustment about a pivot axis disposed transversely relative thereto. Such assembly includes steering means, such as a steering handle, operatively connected to the steering valve by actuating means whereby the steering valve may be conditioned for various steering operations upon movement of the steering means. The actuating means further functions to prevent actuation of the steering valve upon pivotal adjustment of the steering column assembly about such pivot axis.

BRIEF DESCRIPTION OF THE DRAWINGS

Other objects of this invention will become apparent from the following description and accompanying drawings wherein:

FIG. 1 is a partially sectioned side elevational view of a steering arrangement employing the adjustable steering column assembly of this invention therein;

FIG. 2 is an enlarged sectional view taken in the direction of arrows II—II in FIG. 1;

FIG. 3 is a view taken in the direction of arrows III—III in FIG. 2;

FIG. 4 is an enlarged partially sectioned view taken in the direction of arrows IV—IV in FIG. 1;

FIG. 5 is an enlarged sectional view taken in the direction of arrows V—V in FIG. 1;

FIG. 6 is a side elevational view of a portion of the steering arrangement;

FIG. 7 is an enlarged side elevational view of a support bracket, employed in the steering column assembly which is pivotally mounted internally of the support housing partially illustrated in FIG. 6;

FIG. 8 is a sectional view taken in the direction of arrows VIII—VIII in FIG. 6, disclosing means for releasably holding the support bracket in a selected pivoted position on the support housing; and FIG. 9 is a sectional view taken in the direction of arrows IX—IX in FIG. 1.

DETAILED DESCRIPTION

FIG. 1 illustrates a steering arrangement comprising a stationary support housing 10 having a steering column assembly 11 pivotally mounted thereon by a pair of pivot means 12 (FIG. 5). Such pivot means facilitate selective pivotal adjustment of the steering column assembly on the support housing about a pivot axis X disposed transversely relative to such assembly. The assembly includes steering means, such as a handle 13, rotatably mounted thereon for selectively actuating one or more steering valves 14 via actuating means operatively interconnected therebetween.

The actuating means is constructed and arranged to selectively actuate the steering valve in response to movement of handle 13 as well as to prevent actuation of the steering valve upon pivotal adjustment of the steering column assembly about pivot axis X. The assembly comprises a box-like support bracket 15 pivotally mounted on housing 10 by laterally spaced pivot means 12, more clearly shown in FIGS. 5 and 6. In particular, each pivot means comprises a shoulder bolt 16 having a threaded boss 17 threadably secured on the end thereof and disposed on an outboard side of housing 10. The nut has a boss and sleeve bearing 18 mounted thereon and disposed on either side of a sidewall of support bracket 15 for pivotally mounting the same thereon.

Referring again to FIGS. 1–3, the steering column assembly further comprises an upright tubular steering column 19 secured to support bracket 15 and a shaft 20 rotatably mounted in the column. Steering handle 13 is suitably secured to the upper end of the shaft to rotate the same whereas the lower end of the shaft has an L-shaped bracket member 21 secured thereon by bolts 22. A lower leg 23 of member 21 is disposed perpendicular relative to a rotational axis Y of shaft 20 and is universally connected to a first end of a link 24 by a ball and socket connection 25 to provide motion transmitting means translating rotational into reciprocal movement.

Thus, selective rotation of steering handle 13 will function to reciprocate link 24 for steering purposes. As further shown in FIGS. 2 and 3, a plate 26 is welded or otherwise suitably secured to member 21 and has a pair of stop means 27 and 28 adjustably mounted on either end thereof. Such stop means, preferably in the illustrated form of bolts threadably mounted on the plate, are constructed to limit clockwise (C) or counterclockwise (CC) rotation of shaft 20 about rotational axis Y thereof upon their engagement with an inner surface 29 of support bracket 15 (FIG. 3).

Referring to FIGS. 1 and 9, the actuating means further comprises a bellcrank 30 pivotally mounted on support bracket 15 by a single pivot means 31. Such pivot means comprises a bolt 32 threadably attached to a cylindrical boss 33, secured to support bracket 15, and a pair of washers 34 mounted on the bolt to pivotally mount the bellcrank thereon intermediate its ends. A first end of the bellcrank is universally pivoted on a second end of link 24 of the above-described motion transmitting means by a ball and socket connection 35 whereas a second end of the bellcrank is universally pivoted to an upper end of linkage means comprising a push-pull rod assembly 36 by a ball and socket connection 37 (FIG. 5). The lower end of the push-pull rod assembly is suitably connected to a valve spool 38, reciprocally mounted in steering valve 14, by a mechanical linkage schematically illustrated at 39. Thus, reciprocation of link 24 in response to rotation of steering handle 33 will function to pivot bellcrank 30 on pivot means 31 whereby reciprocation of push-pull rod 36 will, in turn, selectively reciprocate valve spool 38.

Referring again to FIG. 5, a novel feature of this invention is the coincident relationship of the pivot axis for ball and socket connection 37, connecting the upper end of the push-pull rod with the bellcrank, with respect to axis X providing the pivot axis for adjusting the steering column assembly relative to support housing 10. In particular, it should be noted that upon either clockwise or counterclockwise movement of the assembly in FIG. 1, about axis X, that the push-pull rod assembly will remain stationary, i.e., not reciprocate. Thus, valve spool 38 of the steering valve will also remain stationary and not affected by such adjustment.

Referring to FIGS. 4 and 5, a self-centering means 40 is operatively connected to the linkage means for automatically returning steering handle 13 and valve spool 38 to their neutral or centered conditions of operation which is highly desirable during a "jerk" steering operation. The self-centering means comprises a rod 41 having its upper end universally pivoted on bellcrank 30 by a ball and socket connection 42. It should be noted that the pivot axis thereof is coincident with pivot axis X for pivot means 12 as well as with the pivot axis for ball and socket connection 37. The lower end of rod 41 is reciprocally mounted in an aperture 43 formed through a guide bracket 44, secured to support housing 10 by a pair of bolts 45.

A bracket 46, secured to the support housing and mounting push-pull rod assembly 36 thereon, has an aperture 47 formed therethrough to permit reciprocal movement of rod 41. The rod has stop means in the form of a washer 48 and a pair of adjustable lock nuts 49 secured thereon to cooperate with a pair of compression coil springs 50 and 51. Coil spring 50 is mounted between washer 48 and bracket 44 whereas coil spring 50 is mounted between the bracket and lock nuts 49 to provide spring means effecting the above-mentioned self-centering function.

FIGS. 6–8 illustrate holding means 52 mounted exteriorly on housing 10 to releasably hold support bracket 15 in three separate pivoted and adjusted positions on the housing. Such holding means comprises a plunger 53 reciprocally mounted in a pair of axially spaced bearing bushings 54 and 55, suitably secured to housing 10. Inboard bushing 54 is secured directly to the housing by a lock nut 56 whereas outboard bushing 55 is threadably mounted in a nut 57 suitably secured to a mounting bracket 58 which is, in turn, secured exteriorly on housing 10.

A compression coil spring 59 is mounted on a shaft 60 of the plunger to have opposite ends thereof engage bushing 55 and a cross pin secured to the shaft. Thus, the spring functions to urge the shaft inwardly towards support bracket 14 to have a frustoconically shaped inboard end 61 of the shaft engage one of three like-shaped seats 62, 63 or 64. The seats are suitably formed in circumferentially spaced relationship on a plate 65, secured internally of support bracket 14. The centers of the seats are preferably disposed on an imaginary arc A defined by a radius having its center at axis X (FIGS. 6 and 7) whereby end 61 of the plunger means will be located precisely in a respective seat upon adjustment of the steering column assembly.

We claim:
1. A steering arrangement comprising
  a stationary support,
  a steering column assembly, including steering means movably mounted thereon and a bracket,
  pivot means pivotally mounting the bracket of said steering column assembly on said support for selective adjustment about a pivot axis disposed transversely relative to said steering column assembly,
  a steering valve, and
  actuating means, including a member pivotally mounted on said bracket, operatively interconnected between said steering means and said steering valve for selectively actuating said steering valve in response to movement of said steering means and for preventing actuation of said steering valve upon pivotal adjustment of said steering column assembly about said pivot axis.

2. The steering arrangement of claim 1 wherein said actuating means further comprises linkage means operatively interconnected between said member and said steering valve, said linkage means being pivotally connected to said member for relative pivotal movement about a pivot axis which is at least substantially coincident with respect to said first-mentioned pivot axis.

3. The steering arrangement of claim 2 wherein said steering valve comprises a valve spool reciprocally mounted therein and wherein said linkage means comprises a push-pull rod assembly interconnected between said member and said valve spool for selectively reciprocating the same in response to movement of said steering means.

4. The steering arrangement of claim 2 wherein said member constitutes a bellcrank pivotally mounted on said bracket between first and second ends thereof and wherein the second end of said bellcrank is pivotally connected to said linkage means.

5. The steering arrangement of claim 4 wherein said actuating means further comprises a shaft rotatably mounted on said bracket and having said steering means secured on an upper end thereof and motion transmitting means pivotally interconnected between the first end of said bellcrank and said shaft for selectively pivoting said bellcrank on said bracket in response to rotation of said shaft by said steering means.

6. The steering assembly of claim 5 wherein said motion transmitting means comprises a bracket secured to a lower end of said shaft and having a leg extending transversely relative to a rotational axis of said shaft and a link pivotally interconnected between said leg and the first end of said bellcrank.

7. The steering arrangement of claim 5 further comprising a pair of stop means secured to said shaft for limiting both clockwise and counterclockwise rotation thereof relative to said bracket.

8. The steering arrangement of claim 7 wherein each of said stop means comprises a bolt threadably mounted in a plate secured to said shaft to have an end thereof engage said bracket upon rotation of said shaft.

9. The steering arrangement of claim 2 further comprising self-centering means operatively connected between said support and said actuating means for automatically returning said steering valve to a predetermined condition of operation upon release of said steering means.

10. The steering arrangement of claim 9 wherein said self-centering means comprises a rod reciprocally mounted in a bracket secured to said support and spring means mounted on said rod between said bracket and stop means attached to said rod.

11. The steering arrangement of claim 10 wherein said spring means constitutes a pair of coil springs mounted on said rod on either side of said bracket.

12. The steering arrangement of claim 10 wherein an upper end of said rod is pivotally mounted on said member.

13. The steering arrangement of claim 10 wherein the upper end of said rod is pivotally mounted on said member for relative pivotal movement about a pivot axis which is at least substantially coincident with respect to said first-mentioned pivot axis.

14. The steering arrangement of claim 1 wherein said bracket comprises a box-like construction pivotally mounted internally of said support by a pair of said pivot means.

15. The steering arrangement of claim 1 further comprising holding means releasably attaching said bracket to said support.

16. The steering arrangement of claim 15 wherein said holding means comprises a plunger reciprocally mounted on said support.

17. The steering arrangement of claim 16 wherein said holding means further comprises means forming at least two recessed seats on an outboard side of said bracket in opposition to an inner end of said plunger for selective engagement therewith.

18. The steering arrangement of claim 17 wherein each of said seats at least approximately lies on an imaginary arc subscribed by a radius having its center coinciding with said pivot axis.

19. The steering arrangement of claim 17 wherein said seats and the inner end of said plunger are each frusto-conically shaped.

20. The steering arrangement of claim 16 further comprising spring means mounted between said plunger and said support for urging said plunger towards said bracket.

* * * * *